(12) United States Patent
Kim et al.

(10) Patent No.: US 11,999,430 B2
(45) Date of Patent: Jun. 4, 2024

(54) FOLDING TYPE ELECTRIC BICYCLES

(71) Applicant: LUL KOREA Co., Ltd., Daegu (KR)

(72) Inventors: Hong Sick Kim, Daegu (KR); Deok In Kim, Daegu (KR)

(73) Assignee: LUL KOREA CO., LTD., Daegu (KR)

( * ) Notice: Subject to any disclaimer, the term of this patent is extended or adjusted under 35 U.S.C. 154(b) by 0 days.

(21) Appl. No.: 17/887,699

(22) Filed: Aug. 15, 2022

(65) Prior Publication Data

US 2023/0331336 A1 Oct. 19, 2023

(30) Foreign Application Priority Data

Apr. 18, 2022 (KR) .......................... 10-2022-0047589

(51) Int. Cl.
*B62K 15/00* (2006.01)
*B62M 6/40* (2010.01)
*B62M 6/90* (2010.01)

(52) U.S. Cl.
CPC ............. *B62K 15/008* (2013.01); *B62M 6/40* (2013.01); *B62M 6/90* (2013.01)

(58) Field of Classification Search
CPC ......... B62K 15/008; B62K 15/00; B62K 3/02
See application file for complete search history.

(56) References Cited

U.S. PATENT DOCUMENTS

| 9,487,262 | B2 * | 11/2016 | Chao | ...................... | B62K 19/18 |
| 2016/0016629 | A1 * | 1/2016 | Wang | ...................... | B62K 5/06 180/208 |
| 2020/0047840 | A1 * | 2/2020 | Newby | .................. | B62K 21/12 |

FOREIGN PATENT DOCUMENTS

| CN | 108622284 A | * | 10/2018 | ........... | B62K 15/008 |
| DE | 10135622 A1 | * | 2/2003 | ............. | B62K 13/00 |
| EP | 2913261 A1 | * | 9/2015 | .............. | B62J 9/003 |
| WO | WO-2007039682 A1 | * | 4/2007 | ............. | B62K 13/00 |

OTHER PUBLICATIONS

Lin et al., One-button-folded traffic bicycle, Oct. 9, 2018, EPO, CN 108622284 A, Machine Translation of Description (Year: 2018).*
Wagner et al., Child's bicycle has extension element connected to forward end section of main frame tube and axially adjustable, and steering column is fastened at forward end of extension element, Feb. 6, 2003, EPO, DE 101 35 622 A1, Machine Translation of Description (Year: 2003).*

* cited by examiner

*Primary Examiner* — James A English
(74) *Attorney, Agent, or Firm* — Rabin & Berdo, P.C.

(57) ABSTRACT

The present invention relates to an electric bicycle, and more particularly, to a folding type electric bicycle capable of minimizing a volume to be folded. The present invention discloses a folding type electric bicycle including: a first body unit including a first frame in which a guide hole passing through at least a portion of a side surface of the first frame, a steering part passing through a front portion of the first frame, and a front wheel part supported by a lower side of the steering part; a second body unit including a second frame connected to the first frame, a pedal part disposed on the second frame, and a rear wheel part coupled to a rear portion of the second frame; and a movement unit passing through the guide hole to linearly move.

7 Claims, 7 Drawing Sheets

FOLDING TYPE ELECTRIC BICYCLES

CROSS-REFERENCE TO RELATED APPLICATIONS

This U.S. non-provisional patent application claims priority under 35 U.S.C. § 119 of Korean Patent Application No. 10-2022-0047589, filed on Apr. 18, 2022, the entire contents of which are hereby incorporated by reference.

FIELD OF THE INVENTION

The present invention disclosed herein relates to an electric bicycle, and more particularly, to a folding type electric bicycle capable of minimizing a volume to be folded.

BACKGROUND ART

In recent years, as environmental problems have issued, a movement of using a bicycle that does not emit a pollutant instead of transportation that uses a fossil fuel is gradually spreading, and thus a demand for the bicycle rapidly increases.

Although the bicycle has a positive aspect, storage of the bicycle is gradually difficult due to a narrow residential space as a housing type is changed into a collective housing type such as an apartment, which is caused by rapid urbanization and population concentration.

Also, the bicycle is required to have improved portability and transportability according to necessity of the bicycle because the bicycle is used for the purpose of transporting a person from a hub of public transportation such as a subway, a bus, and a train to an actual destination.

Accordingly, the portability of the bicycle is partially improved by releasing a folding type electric bicycle that is easily stored and transported in a vehicle trunk, an elevator, and a carriage.

However, since a typical folding type electric bicycle uses a method of folding a frame in half, the typical folding type electric bicycle has a limitation in volume reduction and is hardly carried in a subway, a bus, or a train.

Also, since the typical folding type electric bicycle is not fixed in a folded state, folding may be released, or the folded frame may be opened.

Also, since a battery is inevitably mounted to the typical folding type electric bicycle, the volume reduction through the folding has a limitation, and the folding should be implemented in a state in which the battery and internal wires are stably maintained.

SUMMARY OF THE INVENTION

To solve the above-mentioned limitations, the present invention provides a folding type electric bicycle that has improved portability and is easy to transport.

In accordance with an embodiment of the present invention, a folding type electric bicycle includes: a first body unit 100 including a first frame 110 in which a guide hole 111 passing through at least a portion of a side surface of the first frame 110, a steering part 120 passing through a front portion of the first frame 110, and a front wheel part 130 supported by a lower side of the steering part 120; a second body unit 200 including a second frame 210 connected to the first frame 110, a pedal part 220 disposed on the second frame 210, and a rear wheel part 230 coupled to a rear portion of the second frame 210; and a movement unit 500 passing through the guide hole 111 to linearly move and coupled to the second frame 210 to linearly move along the guide hole 111 so that the second body unit 200 moves relatively to the first body unit 100.

The first body unit 100 may include an upper frame 140 through which the steering part 120 passes and horizontally disposed on the first frame 110.

The upper frame 140 may include a battery therein.

The folding type electric bicycle may further include a seat unit 400 passing through a rear portion of the upper frame 140.

The movement unit 500 may include: a hinge shaft part 510 passing through the guide hole 111 and connected with the second frame 210; and a pair of guide blocks 520 extending from both ends of the hinge shaft part 510 in a radial direction of the hinge shaft part 510 and disposed adjacent to the first frame 110.

The folding type electric bicycle may further include a fixing unit 300 installed on the first frame 100 to restrict a linear movement of the movement unit 500.

The fixing unit 300 may include: a fixing hinge shaft 310 passing through the first frame 110; an interference part 320 configured to implement and release interference with the movement unit 500 through a hinge-rotation at both ends of the fixing hinge shaft 310; and a coupling pin 330 coupled to a coupling groove 112 defined in the first frame 110 in order to fix the interference part 320.

The coupling pin 330 may include: a pin portion 331 disposed on the interference part 320 and inserted to the coupling groove 112; a pin extension portion 332 extending in a radial direction of the pin portion 331; and a pin elastic portion 333 disposed between the pin extension portion 332 and the interference part 320 and configured to provide a restoration force to the pin portion 331.

The second body unit 200 may rotate around the hinge shaft part 510.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE PREFERRED EMBODIMENTS

Hereinafter, a folding type electrical bicycle according to the present invention will be described with reference to the accompanying drawings as stated below.

Figure 1:
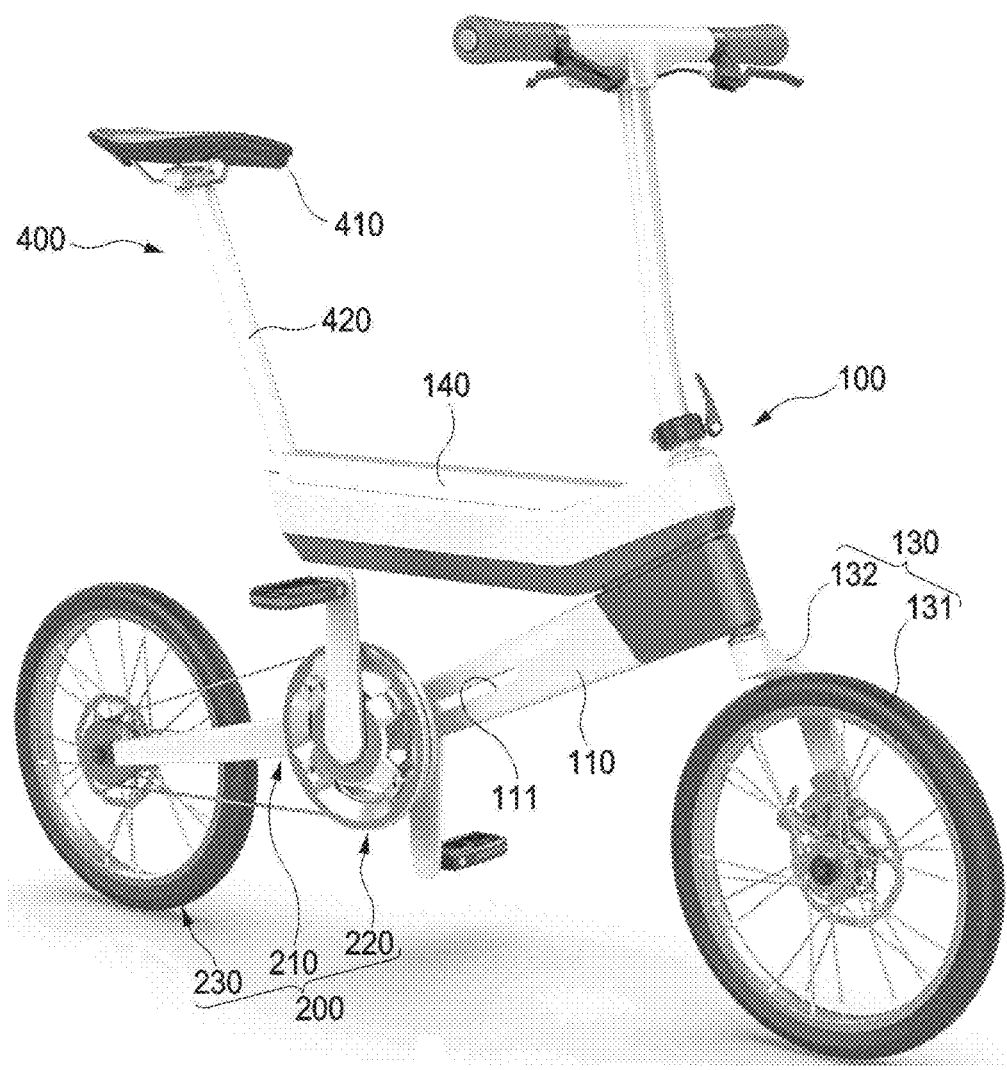
FIG. 1 is a perspective view illustrating a folding type electric bicycle according to the present invention.

As illustrated in FIG. 1, the folding type electrical bicycle according to the present invention includes: a first body unit 100 including a first frame 110 in which a guide hole 111 passing through at least a portion of a side surface thereof is defined, a steering part 120 passing through a front portion of the first frame 110, and a front wheel part 130 supported by a lower side of the steering part 120; a second body unit 200 including a second frame 210 connected to the first frame 110, a pedal part 220 disposed on the second frame 210, and a rear wheel part 230 coupled to a rear portion of the second frame 210; and a movement unit 500 passing through the guide hole 111 to linearly move and coupled to the second frame 210 to move linearly along the guide hole 111, thereby allowing the second body unit 200 to move relatively to the first body unit 100.

Also, the folding type electrical bicycle according to the present invention may further include a seat unit 400 passing through a rear portion of an upper frame 140.

Also, the folding type electrical bicycle according to the present invention may further include a fixing unit 300 installed on the first frame 110 to restrict a linear movement of the movement unit 500.

Also, the folding type electrical bicycle according to the present invention may further include a rotary unit 600 disposed on the movement unit 500 so that the second body unit 200 rotates around a hinge shaft part 510 that will be described later.

The first body unit 100, which includes the first frame 110 in which the guide hole 111 passing through at least a portion of the side surface thereof is defined, the steering part 120 passing through the front portion of the first frame 110, and the front wheel part 130 supported by the lower side of the steering part 120, may have various configurations.

For example, the first frame 110 may include the guide hole 111 passing through at least a portion of the side surface thereof.

That is, the guide hole 111 through which the movement unit 500 is movable may be formed in the first frame 110 so that the second body unit 200 linearly moves forward and backward through the movement unit 500 that will be described later.

Also, a coupling groove 112 to which a coupling pin 330 of the fixing unit 300 that will be described later is inserted and fixed may be further formed in the first frame 110.

The first frame 110 may be horizontally installed or, for another example, inclined upward in a direction toward the front side thereof as illustrated in FIG. 1.

The steering part 120 may pass through the front portion of the first frame 110.

For example, the steering part 120 may include a front frame passing through the front portion of the first frame 110 and a handle part disposed above the front frame to determine a direction through steering of a user.

Also, the steering part 120 may include a display portion (not shown) disposed on the handle part to provide all sorts of information such as exercise information and battery information and further include a lamp installed on the front frame and an adjustment lever (not shown) for adjusting a length in an upward direction of the front frame.

The front wheel 130 supported by the lower side of the steering part 120 may have various configurations.

For example, the front wheel part 130 may include a front wheel frame 132 coupled with the first frame 110 below the front frame passing through the first frame 110 and a front wheel 131 coupled to the front wheel frame 132.

The front wheel frame 132 may be coupled to a lower side of the front frame passing through the first frame 110.

Here, as illustrated in FIG. 1, the front wheel frame 132 may have one end coupled to the front wheel shaft and the other end coupled to the front frame based on one side of the front wheel 131.

The upper frame 140 through which the steering part 120 passes may be horizontally disposed above the first frame 110.

Here, the upper frame 140 may include a battery therein.

That is, the upper frame 140 may have an inner space for mounting the battery therein, and a detachable type or fixed type battery may be disposed in the inner space. Also, all sorts of wires may be connected through the inner space.

The second body unit 200 may include the second frame 210 connected to the first frame 110, the pedal part 220 disposed on the second frame 210, and the rear wheel part 230 coupled to the rear portion of the second frame 210.

The pedal part 220 may be disposed on the second frame 210 and transmit a driving force of the user to the rear wheel part 230.

For example, the pedal part 220 may include a pedal shaft 221 passing through the first frame 110 and coupled to the rotary unit 600, a pedal 222 disposed at each of both ends of the pedal shaft 221 to support a foot of the user, and a gear part 223 connected to each of the pedal 222 and the rear wheel part 230 and transmitting a rotational force to the rear wheel part 230.

Here, the pedal shaft 221 may pass through the guide hole 111 of the first frame 110 and be coupled to the rotary unit 600 that will be described later to rotate together with a rotation of the rotary unit 600.

The rear wheel part 230 may be coupled to the rear portion of the second frame 210.

For example, the rear wheel part 230 may include a rear wheel shaft coupled to the second frame 210 and a rear wheel disposed at the rear shaft.

The rear wheel part 230 may further include a motor that receives a power from the battery and allows the rear wheel to rotate.

The second frame 210 may be connected to a rear portion of the first frame 110.

Here, the second frame 210 may have one end connected to the rear portion of the first frame 110 and the other end connected to the above-described rear wheel part 230, and as the second frame 210 linearly moves along the guide hole 111 of the first frame 110, the overall second body unit 200 may move relatively to the first frame 110 in forward and backward directions.

To this end, the second frame 210 may have one end coupled to the movement unit 500 that will be described later and move together with the movement unit 500 as the movement unit 500 linearly moves along the guide hole 111.

The seat unit 400 may pass through the rear portion of the upper frame 140.

For example, the seat unit 400 that passes through the upper frame 140 may include a seat 410 on which the user is seated and a seat post 420 disposed below the seat 410 and coupled to the upper frame 140 by passing therethrough.

The movement unit 500 may pass through the guide hole 111 to linearly move and coupled with the second frame 210 to linearly move along the guide hole 111 so that the second body unit 200 moves relatively to the first body unit 100.

For example, the movement unit 500 may include: a hinge shaft part 510 passing through the guide hole 111 and connected with the second frame 210; and one pair of guide blocks 520 extending from both ends of the hinge shaft part 510, respectively, in a radial direction of the hinge shaft part 510 and disposed adjacent to the first frame 110.

The hinge shaft part 510 may pass through the guide hole 111 and be connected with the second frame 210.

The hinge shaft part 510 may move along the guide hole 111 in a state of passing through the guide hole 111 and be coupled with the second frame 210 to induce the second frame 210 to move together.

The guide blocks 520 may extend from the both ends of the hinge shaft part 510, respectively, in the radial direction of the hinge shaft part 510 and be disposed adjacent to the first frame 110.

For example, the one pair of guide blocks 520 may be disposed adjacent to side surfaces of the first frame 110, respectively, and have an area greater than that of the guide hole 111 to prevent the hinge shaft part 510 from being separated from the guide hole 111.

Here, the guide blocks 520 may allow the movement unit 500 to move as the user hold the guide blocks 520 and applies an external force to the guide blocks 520.

The fixing unit 300 may be installed on the first frame 110 to restrict the linear movement of the movement unit 500.

Here, although only the fixing unit 300 disposed on a rearmost portion of the movement unit 500 is illustrated, the fixing unit 300 may be provided to each of a frontmost portion and the rearmost portion of the movement unit 500. The fixing unit 300 disposed at the rearmost portion of the movement unit 500 may restrict the linear movement of the movement unit 500 in a state before being folded, and the fixing unit 300 disposed at the frontmost portion of the movement unit 500 may restrict the linear movement of the movement unit 500 in a state after being folded.

Figure 2:
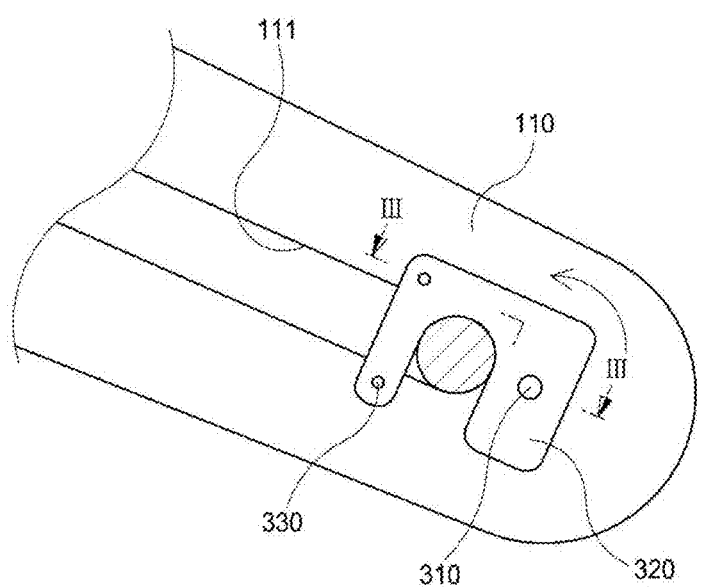
FIG. 2 is a side view illustrating a fixing unit of the folding type electric bicycle of FIG. 1.
Figure 3:
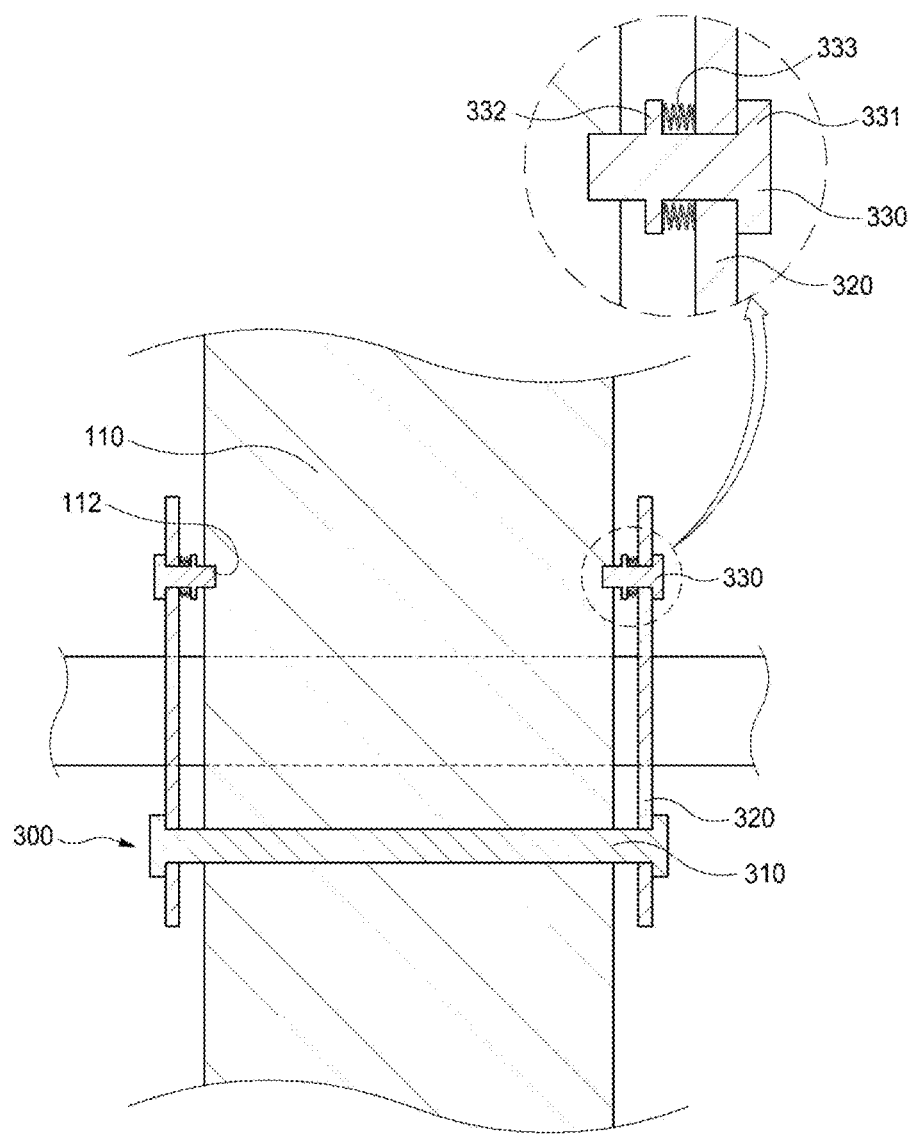
FIG. 3 is a plan view illustrating the fixing unit of the folding type electric bicycle of FIG. 1.
Figure 4:
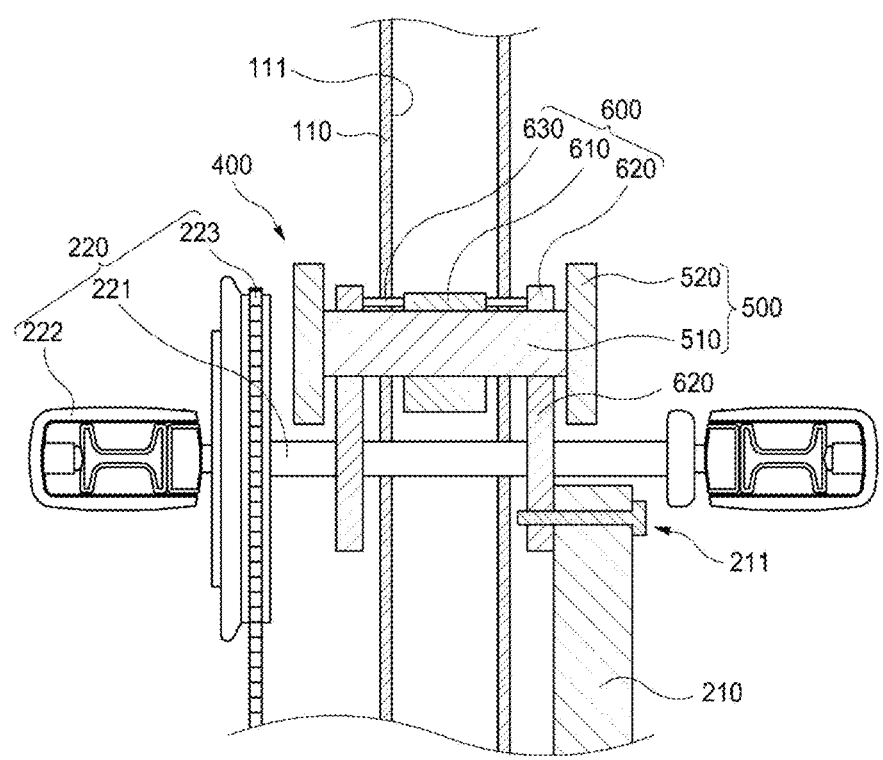
FIG. 4 is a cross-sectional view illustrating the folding type electric bicycle of FIG. 1.
Figure 5A:
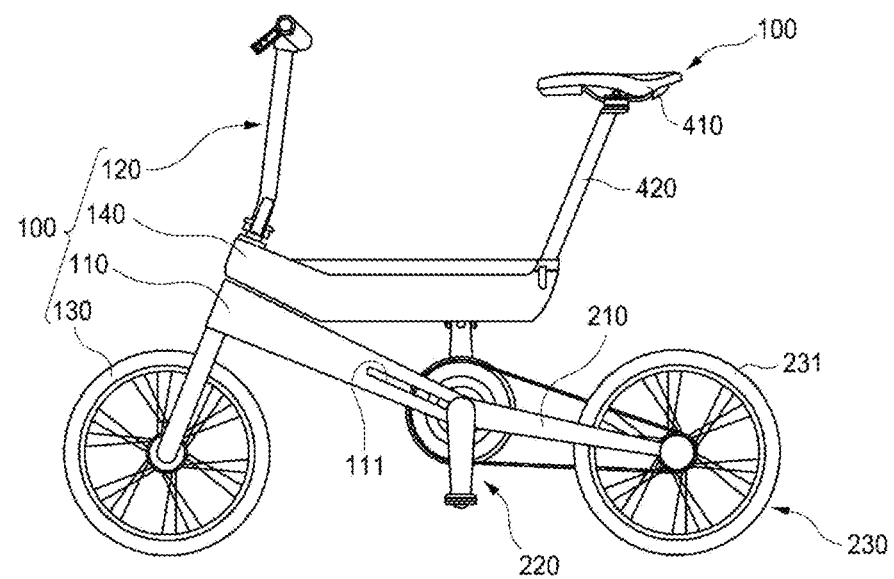
FIGS. 5A to 5C are side views illustrating a folding process of the folding type electric bicycle of FIG. 1.
Figure 5B:
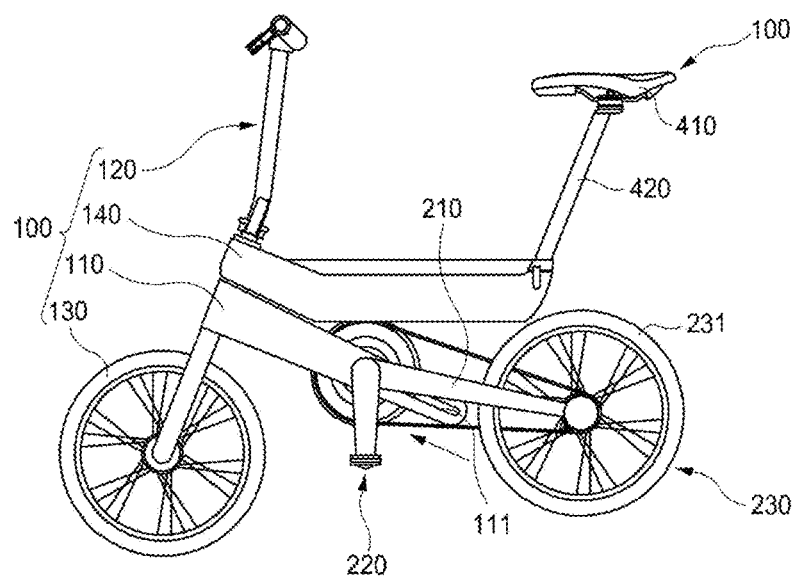
Figure 5C:
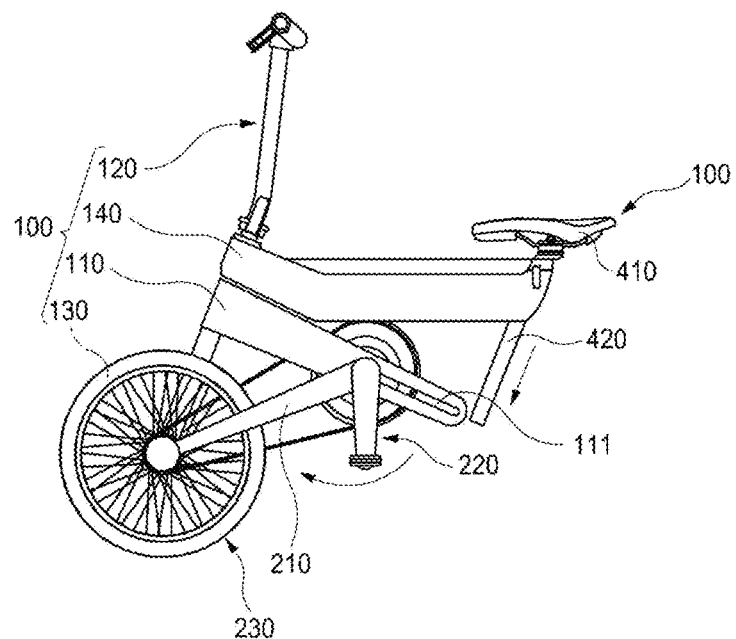

As illustrated in FIGS. 2 and 3, for example, the fixing unit 300 may include: a fixing hinge shaft 310 passing through the first frame 110; an interference part 320 that implements or releases interference with the movement unit 500 through a hinge-rotation at both ends of the fixing hinge shaft 310; and a coupling pin 330 coupled to a coupling groove 112 defined in the first frame 110 to fix the interference part 320.

The fixing hinge shaft 310 may pass through the first frame 110.

For example, the fixing hinge shaft 310 may pass through the first frame 110 disposed at a position adjacent to a rearmost portion and a frontmost portion of the guide hole 111.

The interference part 320 may implement or release the interference with the movement unit 500 through the hinge-rotation at the both ends of the fixing hinge shaft 310.

For example, the interference part 320 may be coupled to hinge-rotate at the both ends of the fixing hinge shaft 310 and particularly prevent a linear movement of the movement unit 500 by performing interference at an upper side or a lower side of each of the hinge shaft part 510 or the one pair of guide blocks 520.

To this end, the interference part 320 may have a shape to be inserted to at least a portion of a circumference of each of the hinge shaft part 510 or the one pair of guide blocks 520.

More particularly, the interference part 320 may include a recessed portion to be inserted to at least a portion of the circumference of each of the hinge shaft part 510 or the one pair of guide blocks 520 and implement or release interference according to the hinge-rotation.

The coupling pin 330 may be coupled to the coupling groove 112 defined in the first frame 110 to fix the interference part 320.

Here, the coupling pin 330 may be inserted to the coupling groove 112 defined in the first frame 110 to fix the hinge-rotation of the interference part 320.

For example, the coupling pin 330 may include: a pin portion 331 disposed on the interference part 320 and inserted to the coupling groove 112; a pin extension portion 332 extending from the pin portion 331 in a radial direction thereof; and a pin elastic portion 333 disposed between the pin extension portion 332 and the interference part 320 and providing a restoration force to the pin portion 331.

That is, as at least one coupling pin 330 is provided at an end of the interference part 320, more preferably, two coupling pins 330 are provided at upper and lower sides of the interference part 320, respectively, the coupling pin 330 may be inserted to the coupling groove 112.

Here, as the pin elastic portion 333 is disposed between the pin extension portion 332 and the interference part 320, when the pin portion 331 is pulled by the external force of the user, the insertion to the coupling groove 112 may be released, and the interference part 320 may hinge-rotate. Also, when the external force of the user is stopped, the pin portion 331 may be inserted to the coupling groove 112 by the restoration force of the pin elastic portion 333.

The rotary unit 600 may be disposed on the movement unit 500 so that the second body unit 200 rotates around the hinge shaft part 510.

That is, the rotary unit 600 may rotate around the hinge shaft part 510 in a state in which the second body unit 200 is disposed at the frontmost portion of the guide hole 111 according to the movement of the movement unit 500, so that the rear wheel part 230 moves toward the front wheel part 130.

To this end, the rotary unit 600 may include a hinge fixing part 610 coupled to the hinge shaft part 510 in the guide hole 111, a hinge rotation part 620 coupled to the hinge shaft part 510 at the side surface of the first frame 110 for the hinge-rotation, and a hinge coupling part 630 coupled with the hinge fixing part 610 to fix the hinge-rotation of the hinge rotation part 620.

The hinge fixing part 610 may be coupled to the hinge shaft part 510 in the guide hole 111, and the hinge shaft part 510 may pass through the hinge fixing part 610.

Here, the hinge fixing part 610 may be coupled with the hinge rotation part 620 through the hinge coupling part 630 to fix the hinge-rotation of the hinge rotation part 620 before or after the rotation of the hinge rotation part 620.

The hinge rotation part 620 may be coupled to the hinge shaft part 510 at a position adjacent to an outer wall of the first frame 110 and implements the hinge-rotation.

Here, the second frame 210 may be coupled to one sidewall of the first frame 110 through a screw 211, and the second frame 210 and the second body unit 200 may rotate around the hinge shaft part 510 according to the rotation of the hinge rotation part 620 in a conjunction manner.

Also, as the pedal shaft portion 221 is coupled to the hinge rotation part 620 by passing therethrough, the pedal part 220 may rotate together with the rotation of the hinge rotation part 620 in a conjunction manner.

The hinge coupling part 630 may be disposed on at least one of the hinge rotation part 620 and the hinge fixing part 610 and couple and fix the hinge rotation part 620 and the hinge fixing part 610 at a position before or after the rotation of the hinge rotation part 620.

Here, the hinge coupling part 630 may include all sorts of components as long as the components couple or separate the hinge rotation part 620 and the hinge fixing part 610. Particularly, the coupling pin 330 may be used as the hinge coupling part 630.

The folding type electric bicycle according to the present invention may be easily and simply folded to strengthen the reliability in the folded state.

Particularly, the folding type electric bicycle according to the present invention may maintain the folded state to be easily carried or transported after being folded.

Also, the folding type electric bicycle according to the present invention may minimize the volume thereof in the folded state through double folding.

Also, the folding type electric bicycle according to the present invention may reduce the volume of the component such as the battery that increases the volume through the folding.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A folding electric bicycle comprising:
    a first body unit comprising a first frame having a guide hole passing through at least a portion of a side surface of the first frame, the first body unit further comprising a steering part passing through a front portion of the first frame, and a front wheel part supported by a lower side of the steering part;
    a second body unit comprising a second frame connected to the first frame, a pedal part disposed on the second frame, and a rear wheel part coupled to a rear portion of the second frame; and
    a movement unit passing through the guide hole to linearly move and coupled to the second frame to linearly move along the guide hole so that the second body unit moves relatively to the first body unit;
    wherein the first body unit further comprises an upper frame through which the steering part passes and that is horizontally disposed on the first frame;
    the folding electric bicycle further comprising a seat unit passing through a rear portion of the upper frame.

2. The folding electric bicycle of claim 1, wherein the upper frame comprises a battery therein.

3. The folding electric bicycle of claim 1, wherein the movement unit comprises:
    a hinge shaft part passing through the guide hole and connected with the second frame; and
    a pair of guide blocks extending from ends of the hinge shaft part in a radial direction of the hinge shaft part and disposed adjacent to the first frame.

4. The folding electric bicycle of claim 3, further comprising a fixing unit installed on the first frame to restrict a linear movement of the movement unit.

5. A folding electric bicycle comprising:
    a first body unit comprising a first frame having a guide hole passing through at least a portion of a side surface of the first frame, the first body unit further comprising a steering part passing through a front portion of the first frame, and a front wheel part supported by a lower side of the steering part;
    a second body unit comprising a second frame connected to the first frame, a pedal part disposed on the second frame, and a rear wheel part coupled to a rear portion of the second frame;
    a movement unit passing through the guide hole to linearly move and coupled to the second frame to linearly move along the guide hole so that the second body unit moves relatively to the first body unit; and
    a fixing unit installed on the first frame to restrict a linear movement of the movement unit,
    wherein the movement unit comprises:
    a hinge shaft part passing through the guide hole and connected with the second frame; and
    a pair of guide blocks extending from ends of the hinge shaft part in a radial direction of the hinge shaft part and disposed adjacent to the first frame, and
    wherein the fixing unit comprises:
    a fixing hinge shaft passing through the first frame;
    an interference part configured to implement and release interference with the movement unit through a hinge-rotation at ends of the fixing hinge shaft; and
    a coupling pin coupled to a coupling groove defined in the first frame in order to fix the interference part.

6. The folding electric bicycle of claim 5, wherein the coupling pin comprises:
    a pin portion disposed on the interference part and inserted into the coupling groove;
    a pin extension portion extending in a radial direction of the pin portion; and
    a pin elastic portion disposed between the pin extension portion and the interference part and configured to provide a restoration force to the pin portion.

7. The folding electric bicycle of claim 3, wherein the second body unit rotates around the hinge shaft part.

* * * * *